United States Patent
Marocchi et al.

(10) Patent No.: US 8,577,385 B2
(45) Date of Patent: Nov. 5, 2013

(54) METHOD AND SYSTEM FOR DELIVERING MEDIA TO A PLURALITY OF MOBILE DEVICES IN A CELL WITH A GROUP TRANSPORT FUNCTION

(75) Inventors: James A. Marocchi, Winfield, IL (US); Trent J. Miller, West Chicago, IL (US); Deborah J. Monks, Palatine, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 58 days.

(21) Appl. No.: 13/184,691

(22) Filed: Jul. 18, 2011

(65) Prior Publication Data

US 2012/0172031 A1 Jul. 5, 2012

Related U.S. Application Data

(60) Provisional application No. 61/428,972, filed on Dec. 31, 2010.

(51) Int. Cl.
*H04W 72/00* (2009.01)

(52) U.S. Cl.
USPC ....... 455/450; 455/3.01; 455/414.1; 455/439; 455/451; 455/453; 455/454; 455/455; 455/466; 370/310.2; 370/312; 370/328; 370/338; 370/390

(58) Field of Classification Search
USPC ............. 455/3.01, 414.1, 439, 450–453, 466; 370/310.2, 312, 328, 338, 390
See application file for complete search history.

(56) References Cited

U.S. PATENT DOCUMENTS

| | | | |
|---|---|---|---|
| 7,336,659 B2* | 2/2008 | Meago | 370/390 |
| 7,509,127 B2* | 3/2009 | Wang et al. | 455/439 |
| 7,640,008 B2 | 12/2009 | Gallagher et al. | |
| 7,647,406 B2 | 1/2010 | Liu | |
| 7,647,411 B1 | 1/2010 | Schiavone et al. | |
| 7,647,429 B2 | 1/2010 | Lee et al. | |
| 7,924,760 B2* | 4/2011 | Ding et al. | 370/312 |
| 7,961,662 B2* | 6/2011 | Hayashi | 370/312 |
| 2007/0189290 A1 | 8/2007 | Bauer | |
| 2008/0232292 A1* | 9/2008 | Zhang | 370/312 |
| 2008/0267109 A1 | 10/2008 | Wang et al. | |

OTHER PUBLICATIONS

3GPP TS 23.246 V9.5.0; 3rd Generation Partnership Project; Technical Specification Group Services and System Aspects; Multimedia Broadcast/Multicast Service (MBMS); Architecture and Functional Description (Release 9); Jun. 2010; 65 Pages.

(Continued)

*Primary Examiner* — Steve D Agosta
(74) *Attorney, Agent, or Firm* — Steven A. May; Randi L. Karpinia

(57) ABSTRACT

A group transfer function (GTF) receives a plurality of inputs and media for delivery to a plurality of mobile devices. The mobile devices are served by a plurality of cells potentially having a plurality of different radio access technologies such that each mobile device is wirelessly connected to one of the cells. The GTF applies policy rules to the inputs to determine, for each mobile device, content delivery using point-to-multipoint or point-to-point media transport based on the capabilities of the servicing cell. The GTF initiates an allocation of a set of resources in each cell to transport the media to each mobile device in the group using the determined media transport for that mobile device. Media is then replicated by the GTF for delivery to the mobile devices over the allocated resources.

19 Claims, 2 Drawing Sheets

(56) References Cited

OTHER PUBLICATIONS

International Search Report and Written Opinion for International Application No. PCT/US2011/067715 mailed on Apr. 4, 2012.
"3rd Generation Partnership Project; Technical Specification Group Services and System Aspects; Enhancements to IMS service functionalities facilitating multicast bearer services (Release 8)," 3GPP Standard, 3GPP TR 23.847, No. V8.0.0, Dec. 1, 2007, pp. 1-19, Chapter 5—p. 6-p. 17.
"3rd Generation Partnership Project; Technical Specification Group Services and System Aspects; Multimedia Broadcast/Multicast Service (MBMS); Architecture and functional description (Release 9)," 3GPP Standard, 3GPP TS 23.246, No. V9.5.0, Jun. 10, 2010, pp. 1-65, p. 8-p. 10, p. 19-p. 30.

* cited by examiner

METHOD AND SYSTEM FOR DELIVERING MEDIA TO A PLURALITY OF MOBILE DEVICES IN A CELL WITH A GROUP TRANSPORT FUNCTION

TECHNICAL FIELD

The technical field relates generally to communication systems and more particularly to a Group Transport Function (GTF) selecting media transport types and initiating resource allocation for each mobile device of a group within one or more cells.

BACKGROUND

Long Term Evolution (LTE) is a radio access technology (RAT) that facilitates end-to end Internet Protocol (IP) service delivery of media to mobile telephone networks. For commercial carriers as well as public safety, security, and defense agencies alike, LTE is quickly emerging as the preferred standard for RATs within the United States.

LTE comprises a set of enhancements to the Universal Mobile Telecommunications System (UMTS), which is described in a suite of Technical Specifications (TS) developed within and publicized by $3^{rd}$ Generation Partnership Project (3GPP). LTE provides, in part, for a flat IP-based network architecture designed to ensure support for common legacy systems such as, for instance, GPRS (general packet radio service) and WiMAX (Worldwide Interoperability for Microwave Access). LTE is a simple, inexpensive architecture that advantageously provides, among others, low latency, high throughput, FDD (frequency-division duplex) and TDD (time-division duplex) in the same platform, and interoperability with older standard wireless technologies such as GSM (Global Systems for Mobile Communications) and standards using Code Division Multiple Access (CDMA) as an underlying channel access method such as cdmaOne™ and CDMA2000®.

Illustratively, in the area of public safety, security, and defense, it is often vital that first responders quickly establish communications as they move to and converge on the locale of a particular incident. The diversity of expertise provided at the incident is often reflected in the variety of user equipment (UE) carried within a group or even by individual responders, as a multitude of RATs and capabilities may be used by the responders' mobile devices both in route to and at the incident. Consequently, a responder may encounter discrepancies in information provided between their personal mobile devices. For example, for a police officer, the capabilities of a mobile phone in that officer's hand may not be the same as the capabilities of a Land Mobile Radio (LMR) radio at the officer's waist. In such a scenario, current LTE systems fail to ensure that the most current information is provided to the officer during a mission critical situation, whichever device is accessed.

Thus, there exists a need to efficiently deliver information to a variety of mobile devices, whether via multicast or unicast transport, across multiple cells that may implement different RATs.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
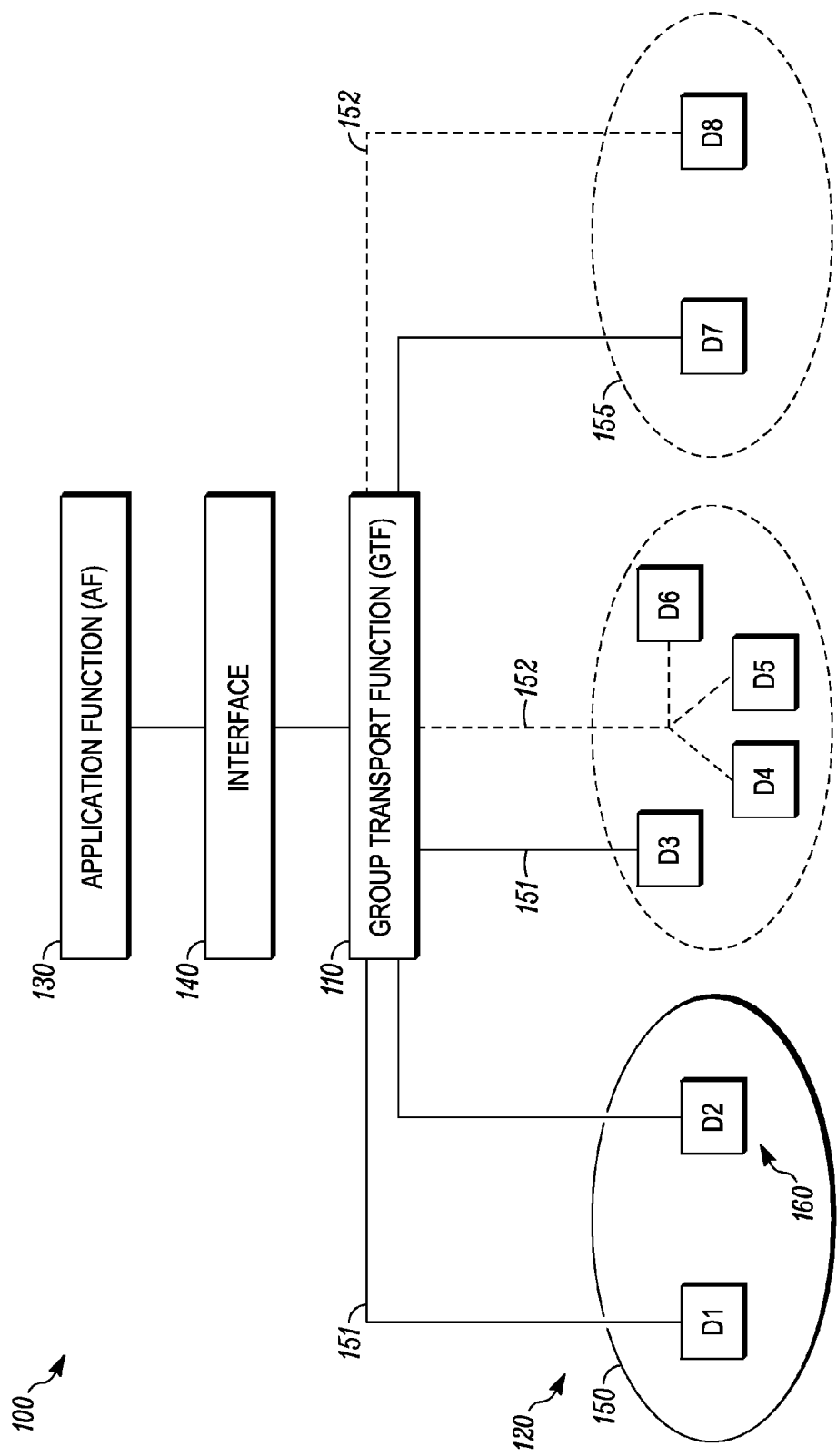
FIG. 1 is a system diagram of a communication system that features a GTF that implements methods for delivering media to a plurality of mobile devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented, where appropriate, by conventional symbols in the drawings, showing only those specific details that are pertinent to understanding the various embodiments so as not to obscure the disclosure with details that will be readily apparent to those of ordinary skill in the art, having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and system for delivering media (e.g. voice, data, video, etc.) to a plurality of mobile devices in a communication group, with a GTF. The GTF receives media for delivery to a plurality of mobile devices in a group. The plurality of mobile devices is served by a plurality of cells such that each mobile device is wirelessly connected to one of the cells. Further, the GTF receives a plurality of inputs that include, among others, capabilities of each mobile device in the group to receive the media using point-to-multipoint media transport and capabilities of each cell in the plurality of cells to deliver the media using point-to-multipoint or point-to-point media transport, such as, among others, multicast or unicast media transport.

With the received media and inputs, the GTF applies a set of policy rules to the plurality of inputs to determine, for each mobile device in the group, whether to deliver the media to the mobile device using point-to-multipoint or point-to-point media transport. Based on the policy determination, the GTF initiates an allocation of a set of resources in each cell to transport the media to each mobile device in the group using the determined media transport for that mobile device. Media is then replicated by the GTF for delivery to the plurality of mobile devices over the allocated resources using the determined media transport for each mobile device. Those skilled in the art will realize that the above recognized advantages and other advantages described herein are merely illustrative and are not meant to be a complete rendering of all of the advantages of the various embodiments.

A few definitions will now be provided that will aid in the understanding of the teachings herein with respect to FIGS. 1 and 2 below. The terms "radio access technology", and "wireless technology" are used interchangeably herein and mean the protocols and accompanying signaling or messaging used between a mobile device and the infrastructure of a radio access network (RAN) (e.g. base stations, eNodeBs, and the like) in order for the mobile device to access (i.e. connect to) the RAN to use bearer resources to send media to and receive media from other entities connected to a wireless network, such as an LTE network. A RAN generally has one or more cells, wherein a cell is defined as being inclusive of a single base station's coverage area or a portion of a base station's coverage area and can be identified, for instance by a cell identifier. A cell implements at least one RAT which includes the protocols of that specific RAT. Moreover, as used herein, different cells or radios having or implementing different RATs means that the cells use different RATs or wireless technologies.

Media transport type is defined as the way in which media is delivered to a mobile device by a RAN and includes point-to-point (PTP) transport between two endpoints, e.g. unicast, and point-to-multipoint (PTM) transport from one endpoint to many endpoints, such as via Multicast Broadcast Multimedia Services (MBMS) and Evolved MBMS (E-MBMS) as described in the 3GPP TSs. As used herein, the term "bearer", "bearer resource", or simply "resource" is defined as a transmission path in a network (such as a RAN) and is used to carry media traffic or control signaling. A bearer can be bidirectional, i.e. having both an uplink path from the mobile device to an application server and a downlink path from the application server to the mobile device; or a bearer can be unidirectional, such as a common PTM downlink path from the application server to the mobile device for MBMS traffic.

A bearer can be PTP (such as a unicast bearer) or a PTM bearer (such as a MBMS or E-MBMS bearer) and has associated therewith a set of characteristics or attributes including, but not limited to, Quality of Service (QoS), a carrier frequency at which data is modulated, a particular bandwidth, bit rate, etc. A default bearer is defined as a non-GBR (guaranteed bit rate) bearer that provides for "best effort" media transmission and is allocated to a mobile device for the duration of its attachment to an LTE-based system, for instance, and need not be explicitly requested. A dedicated bearer is defined as any additional bearer that is established for the same mobile device and is specifically requested by (or on behalf of) a mobile device and can be either non-GBR or GBR.

Referring now to the drawings, and in particular FIG. 1, a system for delivering media in accordance with some embodiments is shown and indicated generally at 100. System 100 includes system elements of: a GTF 110 having a number of logical elements functionally discussed below, a plurality of cells 120 (indicated as ovals, wherein two such cells are labeled 150 and 155) having different RATs, a plurality of mobile devices "D", wherein one such device is labeled 160, an application function (AF) 130 and an interface 140. For purposes of illustration, the system 100 is an LTE-based system meaning that it includes an LTE Evolved Packet Core (EPC) (not shown), that includes at least a Mobility Management Entity (MME), a Multimedia Broadcast Multicast Service Gateway (MBMS GW), a Serving Gateway (SGW), a Packet Data Network Gateway (PDN GW), and a Policy and Charging Rules Function (PCRF). However, system 100 comprises any number of different RATs including, but not limited to, GPRS, LMR, WiMAX, CDMA, analog cellular, WLAN (Wireless Local Area Network), GSM, High-Speed Downlink Packet Access (HSDPA), etc.

The AF 130 is a logical entity contained in an application server (not shown) that provides application services to the mobile devices 160. The GTF 110 can be included in any number of physical entities such as, but not limited to, the application server, an LTE EPC element, a stand alone gateway-type device, etc. The AF 130, GTF 110, and mobile devices 160 are each implemented using (although not shown) a memory, one or more network interfaces, and a processing device that are operatively coupled, and which when programmed form the means for these system elements to implement their desired functionality, for example, as illustrated by reference to the method shown in FIG. 2. The network interfaces are used for passing signaling, also referred to herein as messaging, (e.g. messages, packets, datagrams, frames, superframes, and the like) between the elements of the system 100. The implementation of the network interface in any particular element depends on the particular type of network, i.e. wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic, such as, software applications or firmware stored on the memory device of the system element or through hardware.

The processing device utilized by the AF 130, GTF 110, and mobile devices 160 may be partially implemented in hardware and thereby programmed with software or firmware logic or code for performing functionality described by reference to FIG. 2; and/or the processing device may be completely implemented in hardware, for example, as a state machine or application specific integrated circuit (ASIC) to perform such functionality. The memory implemented by these system elements can include short-term and/or long-term storage of various information needed for the functioning of the respective elements. The memory may further store software or firmware for programming the processing device with the logic or code needed to perform its functionality.

We now turn to a description of the elements of system 100. As shown, the plurality of cells 120 are each connected to the GTF 110. A cell 150 includes mobile devices D1 and D2 within its coverage area. A second cell includes mobile devices D3, D4, D5, and D6 within its coverage area. A cell 155 includes mobile devices D7 and D8 within its coverage area. Each cell from the plurality of cells varies in terms of functional capability. Illustratively, cell 150 implements a RAT that only provides for PTP media transport (with PTP bearers being depicted in FIG. 1 by a solid line). Whereas, the other two cells each implement a RAT that provides for both PTP and PTM media transport (with PTM bearers being depicted in FIG. 1 by a dashed line). Moreover, each cell of the plurality of cells provides bearer resources and associated media transport, at least in part, for one communication group of a plurality of communication groups that within the system 100.

As mentioned above, illustrated in FIG. 1 in solid line at least one bearer resource, e.g. bearers 151 of the system 100, can be PTP, such as a unicast resource. Moreover, as depicted in dashed line, at least one bearer resource, e.g. bearers 152 of the system 100, can be PTM, such as a MBMS bearer, an E-MBMS bearer, and an E-MBMS bearer featuring at least one MBMS single frequency network (MBSFN).

The plurality of cells 120 service the plurality of mobile devices 160 within at least one communication group. Shown in FIG. 1, each mobile device, D1-D8, of the plurality of mobile devices 160 is wirelessly connected to one of the cells of the plurality of cells 120. Illustratively, each cell servicing the corresponding plurality of mobile devices 160 generally stores an internal listing of all devices that the cell is currently servicing and additionally, as an option, a listing of devices in at least one other cell within the plurality of cells, such as all cells that support MBSFNs and proximal or "neighboring" cells at the locale of a particular incident. This term proximal or "neighboring" cell(s) may include all of the neighboring cells for the serving cell, but more likely only includes some of the neighboring cells of the serving cell, wherein a neighboring cell is a cell having an adjacent or proximal coverage area.

The terms "servicing" or "serving" cell(s) means a cell by which a mobile device maintains a current connection to the cell, such as, LTE connection, for group communications. In one embodiment, the serving cell identifies the resources supported by its neighboring cells via pre-configuration, mobile device reports, notifications from an infrastructure element, such as the application function or application server, notifications from its neighboring cells, any other suitable method, or a combination of these methods.

As shown in FIG. 1, each mobile device, D1-D8, of the plurality of mobile devices 160 is served by a corresponding cell. Each cell implements at least one RAT to service the mobile devices. Moreover, each mobile device has capabilities, at least, of implementing the protocol needed to access the serving cell using the RAT that is accommodated by the corresponding servicing cell. However, at least some of the mobile devices may have capabilities of implementing protocols for multiple different RATs. Moreover, each mobile device has capabilities to receive media using only PTP transport or using both PTP and PTM transport, depending on the type of mobile device. For example, certain radios may implement only one RAT; whereas dual mode or multi-mode devices may implement multiple different RATs.

In this disclosure and appended claims, the term "mobile device(s)" is also referred to in the art as communication devices, UE, access devices, access terminals, mobile stations, mobile subscriber units, subscriber units, user devices, and the like, and can be any type of communication device, such as radios, mobile phones, mobile data terminals, Personal Digital Assistants (PDAs), laptops, two-way radios, cellular telephones, and any other device capable of operating in a wired or wireless environment and that can be used by public users (such as consumers) or private users (such as public safety users). Further, a "member", "member of a group", "subscriber" and "user" are used interchangeably and refer to a user of at least one mobile device, such as the police officer in the above illustration having mobile police phone in hand and a fire & rescue LMR radio at the waist. Moreover, a communication group or a group is defined as a plurality of mobile devices that are associated or affiliated via some group association or affiliation technique for the purposes of communicating media. The mobile devices 160 form one or more communication groups.

The application function 130 is a logical function that is layered atop several RANs including the plurality of cells, and may facilitate applications, such as, push-to-talk (PTT), computer aided dispatch (CAD), etc. The application function 130 may provide one or more inputs to the GTF 110 to enable the GTF 110 to determine the particular media transport to use for each of the mobile devices 160 in order to send media from the application function 130 to the mobile devices 160, in accordance with the present disclosure. In addition, the AF 130 obtains information from multiple sources, such as, among others, from an AF client for instance within a mobile device, a 911 system, networks, dispatcher data entry, etc., and may communicate with the plurality of cells 120, for instance to allocate resources and associated QoS for those resources. Each mobile device 160 may also provide input to the GTF 110 in conjunction with the AF 130 in some cases, or independently of the AF 130 in other cases.

Illustratively, in one embodiment, the AF comprises a CAD server that includes a GTF as a functional component such that the CAD server initiates or receives communications from a plurality of mobile users via their plurality of mobile devices, and also receives information about the mobile devices including capabilities of the mobile device. For example, in one embodiment, each subscribing mobile device, such as an LMR, provides information regarding capabilities during registration with the communication system at the CAD such that the CAD provides information regarding the capabilities of each mobile device to a GTF incorporated within the CAD. Alternatively, the GTF receives the information directly from each mobile device or the network (e.g. LTE EPC and/or RAN elements), for example in an embodiment where the GTF is not included with a CAD server.

In accordance with various embodiments of the present disclosure, the GTF 110 receives several inputs from the mobile devices regarding their capabilities for PTM communications and from the RAN (e.g. the cell) regarding the capability of the cells for PTP and PTM communications, and to then determine, based on policies, the most efficient way to deliver media and other application packets from the AF 130 to one or more mobile devices, D1-D8. In one embodiment, the GTF 110 receives input from the AF 130 that includes AF service requirements that are mapped to the appropriate RAT transport based on the information that the GTF 110 has received from various RATs.

The AF 130 is either an infrastructure function or device that supports applications (executed in a processing device) or provision of services to each device of the plurality of mobile devices 160 over the communication network, such as an LTE system. Such applications include, but are not limited to, group-based services, data-based group sessions, Voice over Internet Protocol (VoIP) services, Telephony services, PTT services, PTV (Push-to-Video) services, PTX (push-to-anything) services via unicast or multicast transport. The media can be delivered through an EPS by way of unicast service, MBMS, or E-MBMS Service. In one embodiment, the AF 130 is an infrastructure element of a Public Land Mobile Network (PLMN) of a public safety agency to which the plurality of mobile devices 160 access. As such, the AF 130 comprises, for instance, a CAD server, a media server, or a call controller, etc. In one embodiment, the AF 130 could include the PTT application and, if broadcast/multicast is used for delivery, the MBMS functions as a component of the infrastructure. The PTT application facilitates media delivery to the plurality of mobile devices 160.

The system further includes an interface 140 functionally positioned between the AF 130 and the GTF 110. In one embodiment, the interface 140 comprises an Application Programming Interface (API) of the GTF configured to operate with the AF. The interface 140 comprises one or more network interfaces and a corresponding processing element that are operatively coupled, and which when programmed define the means for system 100's elements to implement their desired functionality. All network interfaces used by the GTF, including the interface 130, are used for passing signaling, also referred to herein as messaging, (e.g. messages, packets, datagrams, frames, superframes, and the like) between the elements of the system 100. The implementation of the network interface in any particular element depends on the particular type of network, i.e. wired and/or wireless, to which the element is connected.

The application function AF 130 provides media and a plurality of inputs to the GTF 110. In some embodiments, like the AF 130, the GTF is a logical function that is layered atop several RANs including the plurality of cells 120 for the at least one communication group defining the system 100. Thus, the GTF operatively receives inputs from the RANs.

Some inputs received by the GTF 110 include, among others, QoS needs of flows specified by the AF (such as QCI, ARP, MBR UL/DL, GBR UL/DL); QoS requirements for media, network needs at the locale of a zone of interest for members of the communication group; anticipated route taken among a plurality of cells to the zone of interest; proximal location of the plurality of mobile devices from a zone of interest to the at least one cell in the plurality of cells; capabilities of each cell in the plurality of cells to deliver media using PTP transport and PTM transport; available capacity of each cell; capabilities of each mobile device in the group to receive media using PTM and/or PTP media transport; the quantity of devices defining the plurality of mobile devices of each cell in the plurality of cells; possible utilization of an alternative device for an individual group member or "subscriber" for reception and transmission of group media; and policy inputs. In particular, policy inputs include, among others, the following: role preferences of some members of the communication group, such as a police chief should always utilize unicast bearers; application preferences; location preferences; reliability preferences; network specific; frequency specific; incident specific; and PLMN specific, such as PLMN member identifications.

Depending on the particular implementation, the plurality of inputs can be provided to the GTF from the application function 130, the plurality of mobile devices 160, each cell infrastructure from the plurality of cells 120 using any suitable interface such as interface 140 or interfaces between the GTF and the networks 120 and using any suitable messaging such as messages, information elements and/or fields within packets, datagrams, etc., already being communicated between the GTF and these other entities. In particular, such information could be provided by extending the mechanisms used in Self-Optimizing Networks (SONs) approaches.

With the plurality of inputs, the GTF 110 applies a set of policy rules to the plurality of inputs to determine, for each mobile device in the group, whether to deliver the media content to the mobile device using PTP (resource 151 of FIG. 1) or PTM media (resource 152) transport. In this disclosure and appended claims the term "set" refers to one or more policy inputs.

The GTF 110 then initiates an allocation for a set of resources in each cell to transport media over the allocated resources using the determined media transport for that particular mobile device. In one embodiment, the GTF 110 initiates allocation of at least one E-MBMS bearer and in another embodiment initiates allocation of at least one MBMS bearer. The GTF 110 replicates media for delivery to the plurality of mobile devices 160 over the allocated resources using the determined media transport for each mobile device.

Figure 2:
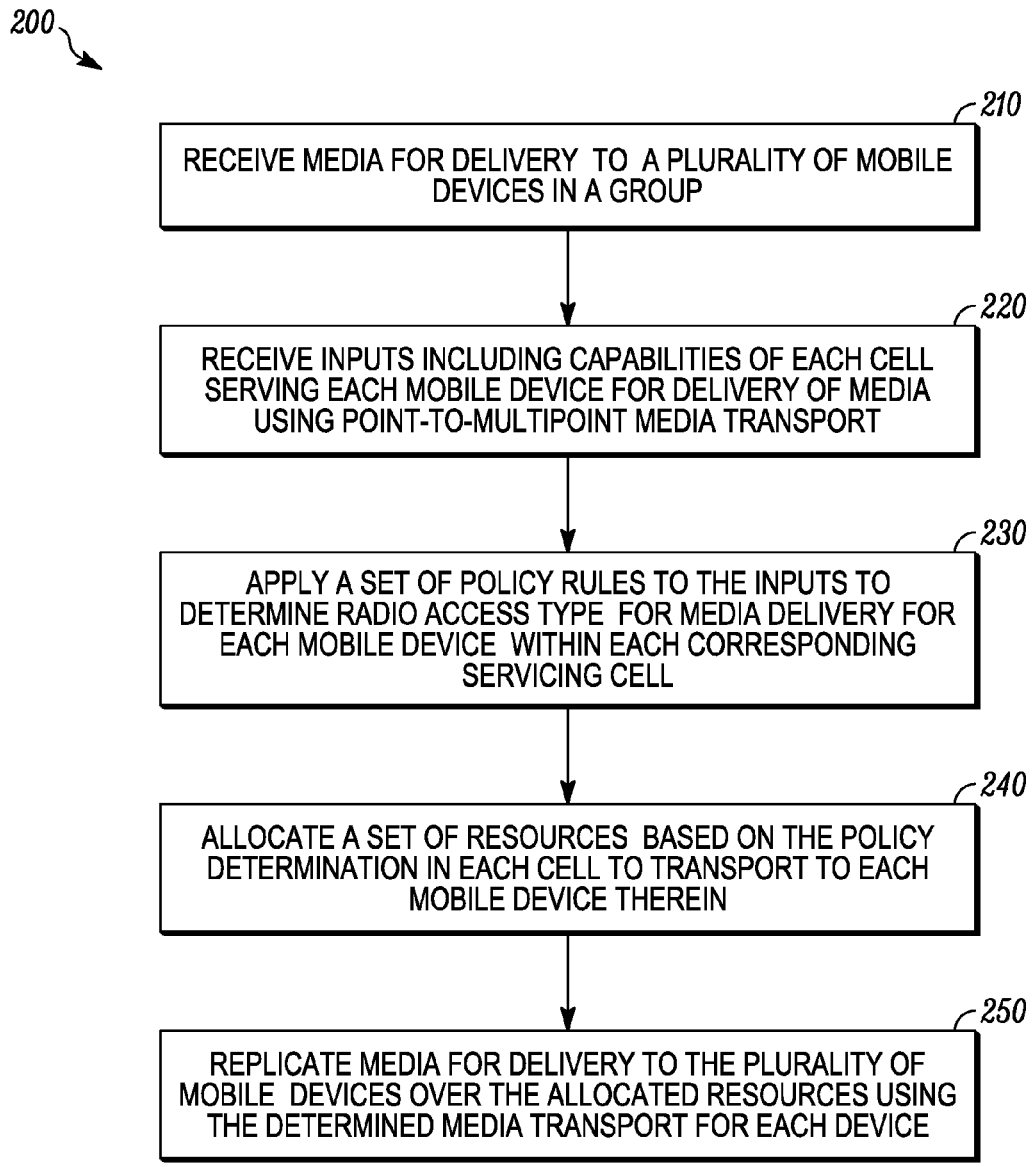
FIG. 2 is a flow diagram illustrating a method performed by a GTF for delivering media to a plurality of mobile devices in a communication group in accordance with some embodiments.

Referring now to FIG. 2, a flow diagram illustrating a general method performed by a GTF for delivering media to a plurality of mobile devices in a communication group is shown and indicated at 200. Illustratively, in at least one embodiment, the functionality illustrated by method for media delivery via a GTF 200 is performed by the system for delivering media 100 of FIG. 1 as discussed above.

At 210, the GTF 110 receives media for delivery to a plurality of mobile devices 160 in a group. Group membership comprising the plurality of mobile devices is identified by the AF. For example, the AF communicates to the GTF: the devices associated with group; application flow QoS needs, and optionally incident location. The plurality of mobile devices 160 is served by a plurality of cells 120 such that each mobile device is wirelessly connected to one of the cells. In one embodiment, the plurality of mobile devices 160 are served by a plurality of cells 120 using at least two different RATs.

At 220, the GTF 110 receives a plurality of inputs, such as one or more of the inputs described above. The inputs include, among others, an indication of the capabilities of each mobile device in the group to receive the media using PTM media transport the and capabilities of each cell in the plurality of cells 120 to deliver the media using PTM media transport and/or PTP media transport. In one embodiment, the GTF continuously receives "real time" updates to the input so that the information upon which its determinations are made stays fresh. Accordingly, it can be said that at least one input received by the GTF 110 is subject to a real time constraint, meaning that the information goes stale and can be discarded if it was not received within a pre-established time threshold. Yet, in a further embodiment, the GTF 110 updates allocation of a set of resources in each cell subject to at least one real time constraint. In this disclosure and appended claims, the term "real time" refers to a mission critical time constraint having minimal latency by which a deadline must be met regardless of system loading. One example is updated location info for the users in the group. If users move into a MC/BC capable cell, the GTF could modify the bearers to support those users with a MC/BC bearer versus unicast bearers.

In one illustrative implementation, the GTF determines, from the plurality of inputs, the serving cell for each device and then determines the capabilities of those serving cells. For example, for cells where responders are/will be located, the GTF determines the bearer delivery capabilities of the associated broadband and narrowband cells (both multicast cell capability and available capacity are analyzed). Optionally, the GTF incorporates the location of an incident that has related group involvement, e.g. based on geo-coordinates for the incident location and the one or more groups responding to the incident. The GTF further determines from the plurality of inputs device capabilities, e.g. whether unicast capable or BC/MC capable, RAT support, battery level, etc. This determination of device capabilities could be performed for one device per user or multiple devices per user.

With the received media and inputs, the GTF 110 at 230 applies a set of policy rules to the plurality of inputs to determine, for each mobile device in the group, whether to deliver the content to the desired mobile device using PTM or PTP media transport and the desired network if a mobile device contains access to more than one RAT. In some embodiments, the set of policy rules comprise policy input received from the AF 130 whereas in other embodiments the policy rules are provided by other well-known functional elements to the GTF 110, such as a system administrator or through some type of provisioning to the GTF.

For example, the application of the policy rules to the inputs could involve an analysis of one or more of the following: network utilization in areas where group members are located, and where incident is occurring; available capacity of cells; unicast and multicast bearer capabilities of each cell; the capabilities of devices associated with group members; possible utilization of alternative device for a group member for reception/transmission of group media; use one device as "wide area modem" and stream media locally to second device; transport policy (e.g. police chief will always utilize unicast bearers) specified by incident response agency or network administrator; anticipated route taken by responders to an incident; QoS needs of Flow specified by AF (e.g. QCI, ARP, MBR UL/DL, GBR UL/DL, wherein QCI=QoS Class Identifier, ARP=Allocation & Retention Priority, MBR=Maximum Bit Rate, GBR=Guaranteed Bit Rate, UL=Uplink, DL=Downlink).

Based on the policy determination, the GTF 110 at 240 initiates an allocation of a set of resources in each cell to transport the media to each mobile device in the group using the determined media transport for that mobile device. Illustratively, in one embodiment, the resources comprise a PTM resource 152 for media delivery from the GTF 110 to the mobile device D4, D5, and D6. In one embodiment, at least one PTP resource is initiated whereas in another embodiment a PTM resource is initiated. In a further embodiment, the GTF initiates at least one resource for an LTE evolved Multicast Broadcast Multimedia Services (eMBMS) communication group whereas in another embodiment, the GTF initiates at least one resource for an LMR-based communication group. Communication of the allocated resources to the mobile devices can use any suitable notification means, such as via the active connection that each device has to the cell in which it is located.

In one example implementation of determining and initiating resources, the GTF determines which devices can benefit from a shared multicast resource. Examples include all group members on MBMS (group) bearer; some group members on MBMS, some group members on unicast bearers; all group members on unicast bearers; if more than x users are in a BC/MC cell, and cell is at or adjacent to incident, set up those users on BC/MC bearer; if less than y users are in a BC/MC cell, and cell is at or adjacent to incident, set up those users on unicast bearers; allocation of subset of group to alternative RAT (i.e. NB LMR). Moreover, the GTF allocates bearers appropriate for devices in the group (some devices are anticipated to share a multicast group). For instance, for a single RAT & group combination, 0 or 1 multicast bearer may be allocated. Allocated bearers may span different RATs. For example, a single group may contain: N LTE UL/DL unicast bearers; 1 LTE DL MBMS bearer; N CDMA UL/DL unicast flows; CDMA DL BCMCS multicast flow.

At 250, media is then replicated by the GTF 110 for delivery to the plurality of mobile devices 160 over the allocated resources, such as resources 151 or 152, using the determined media transport for each mobile device, D1-D8.

In one embodiment, the GTF 110 re-determines utilization of PTP or PTM resources based on updated inputs received by the GTF. For instance, the GTF 110 can determine utilization of multicast and/or broadcast as the group transport. For example, triggers for an update to the allocation of resources can include a change in one or more of: network utilization in areas where group members are located; a change in location of group members; serving RAT by one or more device in the group; serving cell by one or more devices in the group; from a unicast only cell to a MBMS-capable cell or vice versa; media for group, e.g. no need for high resolution video so can switch to low resolution video. The modification to the allocated resources could include one or more of: moving group members from MBMS to unicast; moving group members from unicast to MBMS; switching receiving device (in case where collaborating devices are in use); moving group members to alternative RAT.

The following example benefits can be realized by the present teachings: a single interface to applications regardless of RAT and device that allows content to be delivered to a group (i.e. using unicast or multicast resources appropriate to each RAN); use of network utilization attributes (e.g. unicast vs. multicast capable, % loading, etc.) by a GTF for determination of group bearer service; determination of a method of transport for a group session across multiple types of bearers, including; unicast/multicast transport; determination of group bearers across multiple RATs for a group session; utilization of more than one device per group member for allocation of group session transport; modification of group bearer service based on continuous evaluation of network utilization, user location, and group media attributes; use of application (e.g. CAD) anticipated group location data (e.g. incident location) to reduce unicast/multicast bearer thrashing, and to setup multicast bearers in advance; determination of appropriate group bearer transport based on policy (e.g. command vehicle always gets unicast transmission); determination of appropriate group bearer transport based on device capabilities.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for managing resource utilization in a LTE communication system described herein. The non-processor circuits may include, but are not limited to, a radio receiver, a radio transmitter, signal drivers, clock circuits, power source circuits, and user input devices. As such, these functions may be interpreted as steps of a method to perform managing resource utilization in a LTE communication system described herein. Alternatively, some or all functions could be implemented by a state machine that has no stored program instructions, or in one or more ASICs, in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g. comprising a processing device) to perform a method as described and claimed herein. Examples of such computer-readable storage elements include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPTROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of delivering media to a plurality of mobile devices in a communication group, the method comprising:
   a group transport function (GTF) performing:
   receiving media for delivery to a plurality of mobile devices in a group, wherein the plurality of mobile devices are served by a plurality of cells, wherein each mobile device is wirelessly connected to one of the cells;
   receiving a plurality of inputs comprising at least capabilities of each mobile device in the group to receive the media using point-to-multipoint media transport and capabilities of each cell of the plurality of cells to deliver the media using point-to-multipoint or point-to-point transport;
   applying a set of policy rules to the plurality of inputs to determine, for each mobile device in the group, whether to deliver the content to the mobile device using point-to-multipoint or point-to-point media transport, wherein the policy rules are based on one or more of a role, in the communication group, of a group member associated with the mobile device and a type of an incident for which a group member associated with the mobile device is involved;
   initiating an allocation of a set of resources in each cell to transport the media to each mobile device in the group using the determined media transport for that mobile device, wherein initiating an allocation of a set of resources comprises initiating allocation of at least one Multicast Broadcast Multimedia Service bearer;
   replicating the media; and
   conveying the replicated media to the plurality of cells for delivery to the plurality of mobile devices over the allocated resources using the determined media transport for each mobile device.

2. The method of claim 1, wherein initiating an allocation of a set of resources in each cell further includes updating the plurality of inputs.

3. The method of claim 2, wherein the inputs are provided by each cell to the GTF.

4. The method of claim 1, wherein initiating an allocation of a set of resources in each cell further includes updating allocation of a set of resources in each cell subject to at least one real time constraint.

5. The method of claim 1, wherein initiating an allocation of a set of resources in each cell further includes re-determining utilization of point-to-point or point-to-multipoint resources based on updated inputs received by the GTF.

6. The method of claim 1, wherein the plurality of mobile devices are served by a plurality of cells operating using at least two different radio technologies.

7. The method of claim 1, wherein initiating an allocation of a set of resources comprises initiating a point-to-multipoint resource or a point-to-point resource.

8. The method of claim 1, wherein the group is a first responder group.

9. The method of claim 1, wherein initiating an allocation of a at least one Multicast Broadcast Multimedia Service bearer comprises initiating at least one resource for an LTE evolved Multicast Broadcast Multimedia Services (eMBMS) communication group.

10. The method of claim 1, wherein initiating an allocation of a set of resources comprises initiating at least one resource for a Land Mobile Radio (LMR)-based communication group.

11. The method of claim 1, wherein the plurality of inputs further comprises proximal location of the plurality of mobile devices from a zone of interest to at least one cell in the plurality of cells.

12. The method of claim 1, wherein the plurality of inputs further comprises a least one of an available capacity of each cell in the plurality of cells and a quantity of devices defining the plurality of mobile devices of the group of each cell in the plurality of cells.

13. A system for delivering media to a plurality of mobile devices in a communications group, the system comprising:
   an infrastructure device implementing a group transport function (GTF) and connected to a plurality of cells that serve the plurality of mobile devices within the communications group, wherein each cell includes a point-to-point resource and at least one cell includes a point-to-multipoint resource; and another infrastructure device implementing an application function, the application function providing the media to the GTF;

wherein the GTF receives a plurality of inputs from the application function and the plurality of cells, the plurality of inputs including at least capabilities of each mobile device in the group to receive the media using point-to-multipoint media transport and capabilities of each cell in the plurality of cells to deliver the media using point-to-multipoint or point-to-point transport, and wherein the GTF determines, for each mobile device within the communications group and based on the plurality of inputs and one or more of a role, in the communication group, of a group member associated with the mobile device and a type of an incident for which a group member associated with the mobile device is involved, whether to deliver the content to the mobile device using point-to-multipoint or point-to-point media transport;

wherein the GTF initiates allocation of a set of resources in each cell to transport media to each mobile device in the group using the determined media transport for that mobile device and wherein initiating allocation of a set of resources comprises initiating allocation of at least one Multicast Broadcast Multimedia Service bearer;

wherein the GTF replicates media for delivery to the plurality of mobile devices over the allocated resources using the determined media transport for each mobile device.

14. The system of claim 13 further comprising an interface functionally coupled between the AF and the GTF.

15. The system of claim 13, wherein the resources allocated in the plurality of cells comprise a plurality of radio access types.

16. The system of claim 13, wherein the plurality of inputs further comprises proximal location of the plurality of mobile devices from a zone of interest to at least one cell in the plurality of cells.

17. The system of claim 13, wherein the communications group is a first responder communications group.

18. An infrastructure device, the infrastructure device comprising:

a processing device that is configured to implement a group transport function (GTF) performing:

receiving media for delivery to a plurality of mobile devices in at least one group, wherein the plurality of mobile devices are served by a plurality of cells, wherein each subscriber uses at least one mobile device, wherein each mobile device is wirelessly connected to one of the cells, wherein each cell is to connected to at least one network;

receiving a plurality of inputs comprising at least capabilities of each mobile device in the group to receive the media using point-to-multipoint media transport and capabilities of each cell in the plurality of cells to deliver the media using point-to-multipoint or point-to-point media transport;

applying a set of policy rules to the plurality of inputs to determine, for each mobile device in the group, whether to deliver the content to the mobile device using point-to-multipoint or point-to-point media transport, wherein the policy rules are based on one or more of a role, in the communication group, of a group member associated with the mobile device and a type of an incident for which a group member associated with the mobile device is involved;

initiating an allocation of a set of resources in each cell to transport the media to each mobile device using the determined media transport for that mobile device, wherein initiating an allocation of a set of resources comprises initiating allocation of at least one Multicast Broadcast Multimedia Service bearer; and replicating the media for delivery to the plurality of mobile devices over the allocated resources across at least one group using the determined media transport for each mobile device.

19. The infrastructure device of claim 18, wherein the group is a first responder communications group.

* * * * *